United States Patent Office 3,038,877
Patented June 12, 1962

---

3,038,877
DIALKYL TIN BIS-(POLY-HALOGENATED PHENATES) AND HALOGENATED SYNTHETIC RESINS CONTAINING SAME
Robert C. Harrington, Jr., and James L. Smith, Kingsport, Tenn., assignors to Eastman Kodak Company, Rochester, N.Y., a corporation of New Jersey
No Drawing. Filed Feb. 18, 1960, Ser. No. 9,451
12 Claims. (Cl. 260—45.5)

This invention relates to ultraviolet light stabilized halogenated synthetic resins containing dialkyl tin bis-(polyhalogenated phenolates).

The prior art discloses the use of zinc, lead, tin, and other organo-metallic phenol derivatives in paraffin, synthetic rubber, etc. for various purposes; however, the use of polyhalogenated diphenolate dialkyl tin salts is not only novel but very unexpectedly results in stability to actinic radiation such as ultraviolet light in halogenated synthetic resins as described below.

A very large number of compounds which are known heat or oxidation stabilizers are not useful for protection against actinic radiation, hence, the discovery of this invention is quite unobvious besides being novel and exceptionally useful. Another valuable feature of this invention is the high degree of compatibility of the stabilizers in the polymer composition.

One theory as to the instability of halogen-containing vinyl resins toward actinic radiation is that discoloration is probably due to radiation catalyzed loss of hydrogen halide (HX) from the polymer molecule and subsequent combined cross-linking and breakdown. Tests of various stabilizers useful as regards heat and oxidation degradation reveal that such stabilizers are generally of relatively little value in preventing ultraviolet discoloration so that there is a definite loss of effectiveness after 20 hours of Fade-Ometer apparatus exposure. This test apparatus is well known in the art and is manufactured by Atlas Electric Devices Co., Chicago, Illinois. The particular type employed is designated Type FDA-R with an enclosed carbon arc lamp and controlled ultaviolet light, temperature and humidity.

An object of this invention is to provide a means for preventing discoloration in halogen-containing vinyl resins when they are subjected to the action of sunlight or other ultraviolet rich sources. Another object of this invention is to provide such a stabilizer which is effective in very small amounts. A still further object of this invention is to provide an effective ultraviolet stabilizer for halogen-containing vinyl resins which does not exude from the resin or fiber, and which is sufficiently insoluble in common solvents that it is not easily removed from the resin or fiber.

Another object is to provide light stabilized halogen-containing resinous polymers.

Other objects will become apparent elsewhere herein.

A preferred embodiment of this invention provides a resinous film-forming polymer composition stabilized against color degradation due to actinic radiation comprising at least 25 mole percent based on the resinous polymeric components of a highly polymeric halogenated mono-olefinic polymerizable organic hydrocarbon compound, which polymer composition contains from 0.05 to about 3 percent by weight of the polymer composition of a dialkyl tin halogenated diphenate stabilizer having the following formula:

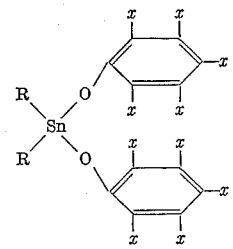

wherein each R represents an alkyl radical containing from 1 to 6 carbon atoms, each $x$ represents an atom selected from the group consisting of Cl, Br and H atoms and each benzene ring has at least 2 halogen atoms, said polymer composition being capable of remaining substantially undiscolored for at least 60 hours under exposure to actinic radiation which would substantially discolor an unstabilized polymer composition in 20 hours.

The tin compounds used according to this invention are not esters but are salts of highly halogenated phenols. Such a salt is more stable than the compounds listed in the prior art and has a lower percentage of tin. This means that a very high degree of inhibitor effectiveness can be had with comparatively little of the expensive organo-tin part of the molecule. As a further example of the comparative effectiveness of this invention the following table of data was prepared whereby a vinylidene chloride resin was dissolved to form a 27% solution in acetone, the compound being tested was added, a thin sheet was cast and it was then exposed in a Fade-Ometer apparatus which is identified above. The particular vinylidene chloride resin used was primarily a copolymer containing about 50% by weight of acrylonitrile. Similar results can be obtained using other halogenated polymers and copolymers, especially when the halogenated polymer comprises 25% or more of the entire synthetic resin.

| Compound | Percent Added [1] | Fade-Ometer Exposure Hours | Color |
|---|---|---|---|
| Di-n-butyl tin diacetate | 1 | 20 | clear. |
| Do | 1 | 40 | tan. |
| Di-n-butyl tin maleate | 1 | 20 | light tan. |
| Do | 1 | 40 | tan. |
| Di-n-butyl tin dilaurate | 1 | 20 | light tan. |
| Do | 1 | 40 | brown. |
| Di-n-butyl tin dipentachlorophenate | 1 | 20 | clear. |
| Do | 1 | 40 | Do. |
| Do | 1 | 60 | Do. |
| Control | | 20 | brown. |

[1] Based on resin solids.

This table shows that the compound di-n-butyl tin dipentachlorophenate is much more effective than those compounds cited in the prior art. In this connection, it is obvious that both the alkyl group, the halogen, and the halogenated phenolic group can be changed within reasonable limits without materially changing the inhibitory effects produced.

Particularly important embodiments of this invention comprise stabilizing against actinic radiation deterioration mono-olefinic fiber-forming polymers of (A) 70% to 95% by weight of a copolymer of from 30% to 65% by weight vinylidene chloride and 70% to 35% by weight of acrylonitrile, and
(B) 30% to 5% by weight of a polymer selected from the group consisting of (1) a homopolymer of an N-alkylacrylamide wherein the alkyl group contains from 1 to 6 carbon atoms, (2) a copolymer of N-alkyl acrylamide and N-alkyl methacrylamide wherein each alkyl group contains 1 to 6 carbon atoms, and (3) a copolymer consisting of at least 50% by weight of an N-alkyl acrylamide wherein the alkyl group contains 1 to 6 carbon atoms and not more than 50% by weight of a polymerizable monovinyl pyridine monomer.

However, this invention also advantageously covers any of the film-forming polymers, mixed polymers and copolymers of vinyl chloride, vinylidene chloride and other polymerizable halogenated mono-olefinic hydrocarbons containing from 2 to 15 carbon atoms, e.g. chlorinated vinylnaphthalene copolymers, chlorinated vinyl laurate copolymers, polychlorostyrene, etc. The copolymeric or admixed polymeric constituent free of halogen is advantageously not in excess of 75% by weight of the entire polymer composition and can be derived from any of the compatible mono-olefinic polymerizable organic compounds containing from 2 to 20 carbon atoms such as acrylonitrile, vinyl acetate, methyl methacrylate, styrene, vinyl alcohol, vinyl propionate, ethyl acrylate, acrylamide, vinyl bromide, N-methyl acrylamide, vinylidene bromide, monovinyl pyridine, N-butyl methacrylamide, monovinyl hydroquinone, monovinyl benzophenone, monovinyl cyclohexane, tetrafluoroethylene, etc. Those skilled in the art are well aware of the vast variety of such polymers, copolymers and mixtures thereof, hence there is no point in burdening this specification by further elaboration.

As already made clear, this invention relates to stability toward actinic radiation of fiber and film-forming polymers and is not concerned with rubbery compositions, adhesives, impregnating compositions, cross-linked polymers of divinyl compounds or conjugated di-olefins, etc. which are of no value in rope, wire insulation, fabrics, protective wrappings, artificial leather clothing, tent fabrics, automobile convertible tops, seat covers, upholstery, draperies, rugs, and other fiber, film or extruded products which may be subjected to considerable actinic radiation, sunlight being especially likely to cause damage.

Since tin compounds are normally quite toxic, an especially advantageous aspect of the present invention is that the stabilizer compounds contain a relatively small percentage of tin in the total molecular weight, and the high degree of stabilizing effectiveness permits the use of exceptionally low concentrations. Thus, articles which may come into contact with the skin of humans or animals such as clothing, artificial leather shoes, rainwear, etc. are of greatly reduced health and safety hazard. In such cases amounts not exceeding 1% by weight of the resinous polymeric components can be employed. Similar results were quite surprisingly discovered in connection with the use of zinc salts of phosphorus compounds as described in our copending application Serial No. 4,187, filed on January 25, 1960.

The expression resinous polymeric components as used herein does not include other additives in fiber and film-forming compositions such as pigments, plasticizers, dyes, antioxidants, heat stabilizers, residual solvents, anti-blocking additives, non-resinous polyester plasticizers, etc.

This invention can be further illustrated by the following examples of preferred embodiments although it will be understood that these examples are included merely for purposes of illustration and are not intended to limit the scope of the invention unless otherwise specifically indicated:

*Example I*

An amount of di-n-butyl tin dipentachlorophenate equal to 1% based on polymer weight was intimately mixed with a halogen-containing polymer of the polyvinylidene chloride type. This inhibited polymer solution was spun to form filaments by conventional means to provide light-fast polymeric fibers, yarns, fabrics and such articles which suffer no adverse significant change in their stability characteristics. It has been found that di-n-butyl tin dipentachlorophenate is effective in the amount of 0.25% based on polymer weight. It is of course effective in greater amounts, but there is no need to go higher than 1% for most uses.

The following tabulation further illustrates this example:

|  | Control Fiber | Same Fiber +1% di-n-butyl tin di (pentachlorophenate) |
|---|---|---|
| Strength, grams/denier | 1.40 | 1.40 |
| Percent elongation | 47.0 | 47.8 |
| Flow point, ° C | 111.3 | 114.0 |

After heating the fibers at 150° C. for five minutes the properties were:

|  | Control Fiber | Same Fiber +1% di-n-butyl tin di (pentachlorophenate) |
|---|---|---|
| Strength, grams/denier | 1.56 | 1.71 |
| Percent elongation | 54.4 | 58.6 |
| Flow point, ° C | 128.0 | 129.3 |

Many of the tests used in Example I were run using film of other compositions; thus, similar results were obtained with polyvinyl chloride and its copolymers.

*Example II*

Similar results to those described in Example I can be obtained using other stabilizers contemplated by this invention. Diethyl tin di-(tribromophenate), prepared from diethyl tin dichloride and sodium tribromophenate, was added in an amount equal to 0.5% based on solids weight to a solution of a polymeric mixture of a copolymer as described in Example I including approximately 1 out of 5 parts by weight of a polymerized N-lower alkyl acrylamide in acetone. Yarn spun from this solution was much more stable to the effects of actinic rays as shown by the fact that the fibers did not show darkening after 60 hours' exposure in a Fade-Ometer.

The stabilizers of this invention can be prepared by stirring a dialkyl tin dichloride dissolved in a suitable organic solvent while gradually adding a stoichiometric quantity of the sodium salt of a polyhalogenated phenol and then refluxing at an elevated temperature determined by the solvent until an optimum yield of product is obtained. The sodium chloride is then filtered off and the solvent removed by vaporization. The product can then be purified to any desired degree by recrystallization from ethyl alcohol or other solvents. This aspect of the invention can be further illustrated by the following example:

*Example III*

Di-n-butyl tin di(pentachlorophenate) was prepared by dissolving 50 grams of di-n-butyl tin dichloride in 500 ml. of toluene placed in a flask fitted with a stirrer, condenser and thermometer. One hundred grams of sodium pentachlorophenate were slowly added and the mixture was refluxed for two hours. The mixture was filtered to remove sodium chloride and most of the toluene was removed by vaporization. On cooling, the precipitate was removed by filtration and recrystallized from ethyl alcohol. The product was air dried and was a light cream colored solid.

Phenolates which may be employed in the synthesis of the inhibitors are the alkali metal salts of phenols such as tetrachlorophenol, trichlorophenol, pentachlorophenol, tribromophenol, pentabromophenol, etc.

Dialkyl tin chlorides which may be used are, for example, di-n-butyl tin dichloride, diethyl tin dichloride, dimethyl tin dichloride, diisopropyl tin dichloride, di-tert. butyl tin dichloride, etc.

The ultraviolet stabilizers of this invention can be used for stabilizing polyacrylonitrile+polyvinyl chloride and other homopolymers as well as the copolymers and mixed polymers described above. Since the ramifications and applications of this invention are now completely apparent to those skilled in the art from the preceding description it would be unnecessarily burdensome to detail numerous further examples.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A resinous film-forming polymer composition stabilized against color degradation due to actinic radiation comprising at least 25 mole percent, based on the resinous polymeric components of the film-forming composition, of a high polymer of a halogen-substituted mono-olefinic polymerizable organic hydrocarbon compound, which resinous polymer composition contains from 0.05 to about 3 percent by weight, based on the polymeric components of the film-forming composition, of a dialkyl tin bis(halogen-substituted phenate) stabilizer having the following formula:

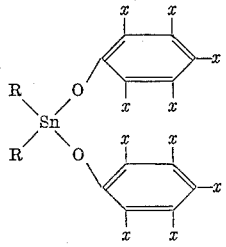

wherein each R represents an alkyl radical containing from 1 to 6 carbon atoms, each x represents an atom selected from the group consisting of Cl, Br and H atoms and on each benzene ring there are at least 2 halogen atoms.

2. A polymer composition as defined by claim 1 wherein said stabilizer is di-n-butyl tin bis(pentachlorophenate).

3. A polymer composition as defined by claim 1 wherein said stabilizer is diethyl tin bis(tribromophenate).

4. A polymer composition as defined by claim 1 wherein the polymeric components of the composition consist essentially of
   (A) 70% to 95% by weight of a copolymer of from 30% to 65% by weight vinylidene chloride and 70% to 35% by weight of acrylonitrile, and
   (B) 30% to 5% by weight of a polymer selected from the group consisting of (1) a homopolymer of an N-alkylacrylamide wherein the alkyl group contains from 1 to 6 carbon atoms, (2) a copolymer of N-alkyl acrylamide and N-alkyl methacrylamide wherein each alkyl group contains 1 to 6 carbon atoms, and (3) a copolymer consisting of at least 50% by weight of an N-alkyl acrylamide wherein the alkyl group contains 1 to 6 carbon atoms and not more than 50% by weight of a polymerizable monovinyl pyridine monomer.

5. A polymer composition as defined by claim 4 wherein the stabilizer is di-n-butyl tin bis(pentachlorophenate).

6. A polymer composition as defined by claim 4 wherein the stabilizer is diethyl tin bis(tribromophenate).

7. A polymer composition as defined by claim 1 wherein the polymeric components consist essentially of polyvinyl chloride.

8. A polymer composition as defined by claim 7 wherein the stabilizer is di-n-butyl tin bis(pentachlorophenate).

9. A polymer composition as defined by claim 7 wherein the stabilizer is diethyl tin bis(tribromophenate).

10. A dialkyl tin bis(halogen-substituted phenate) having the following formula:

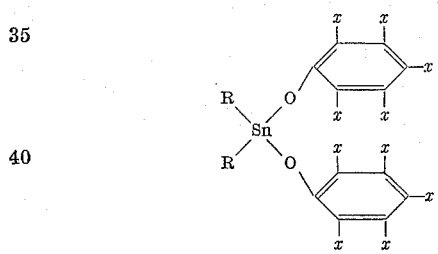

wherein each R represents an alkyl radical containing from 1 to 6 carbon atoms, each x represents an atom selected from the group consisting of Cl, Br and H atoms and each benzene ring has at least 2 halogen atoms.

11. Di-n-butyl tin bis(pentachlorophenate).

12. Diethyl tin bis(tribromophenate).

References Cited in the file of this patent
UNITED STATES PATENTS
2,346,808     Winning et al. _____ Apr. 18, 1944